United States Patent
Lin et al.

(10) Patent No.: US 9,806,580 B2
(45) Date of Patent: Oct. 31, 2017

(54) MOTOR HAVING STATOR ASSEMBLY WITH INTEGRATED MOUNTING AND HEAT SINK FEATURES

(71) Applicant: Lin Engineering, Morgan Hill, CA (US)

(72) Inventors: Ted T. Lin, Saratoga, CA (US); Richard L. Badgerow, Watsonville, CA (US); Ryan C. Lin, Cupertino, CA (US)

(73) Assignee: Lin Engineering, Inc., Morgan Hill, CA (US)

( * ) Notice: Subject to any disclaimer, the term of this patent is extended or adjusted under 35 U.S.C. 154(b) by 146 days.

(21) Appl. No.: 14/826,455

(22) Filed: Aug. 14, 2015

(65) Prior Publication Data
US 2016/0049843 A1 Feb. 18, 2016

Related U.S. Application Data

(60) Provisional application No. 62/038,132, filed on Aug. 15, 2014.

(51) Int. Cl.
| | |
|---|---|
| *H02K 5/04* | (2006.01) |
| *H02K 1/14* | (2006.01) |
| *H02K 1/20* | (2006.01) |
| *H02K 5/15* | (2006.01) |
| *H02K 5/18* | (2006.01) |
| *H02K 37/18* | (2006.01) |

(52) U.S. Cl.
CPC ............... *H02K 5/04* (2013.01); *H02K 1/146* (2013.01); *H02K 1/20* (2013.01); *H02K 5/15* (2013.01); *H02K 5/18* (2013.01); *H02K 37/18* (2013.01)

(58) Field of Classification Search
CPC .. H02K 5/04; H02K 5/18; H02K 1/20; H02K 5/15; H02K 1/146; H02K 37/18
See application file for complete search history.

(56) References Cited

U.S. PATENT DOCUMENTS

| | | | |
|---|---|---|---|
| 2,808,556 A * | 10/1957 | Thomas | H02K 37/04 310/112 |
| 7,752,733 B1 * | 7/2010 | Badgerow | H02K 15/022 29/596 |
| 8,278,803 B2 | 10/2012 | Lin et al. | |
| 8,283,841 B2 | 10/2012 | Lin et al. | |
| 2011/0037352 A1 * | 2/2011 | Lin | H02K 5/15 310/402 |
| 2014/0197705 A1 * | 7/2014 | Sato | H02K 5/04 310/91 |

* cited by examiner

*Primary Examiner* — Mohamad Musleh
(74) *Attorney, Agent, or Firm* — Thomas Schneck

(57) ABSTRACT

A step motor integrates its mounting face and heat sink into the stator design. In particular, mounting holes (typically, four in number) are provided through the stator stack in outer perimeter areas. The stator stack itself becomes the mounting surface, allowing the heat generated from the stator to conduct directly to the mounting plate. The front end cap for holding the rotor in alignment is situated inside of the stator's mounting surface and takes no part in mounting the motor to the mounting surface. The end caps only hold the rotor in proper relation within the stator and contain the bearing assembly for the rotor's axial drive shaft. The perimeter of the stator assembly between the mounting screw holes may have saw-tooth cutouts that define heat-dissipation fins.

7 Claims, 6 Drawing Sheets

MOTOR HAVING STATOR ASSEMBLY WITH INTEGRATED MOUNTING AND HEAT SINK FEATURES

CROSS-REFERENCE TO RELATED APPLICATION

This application claims priority under 35 U.S.C. 119(e) from U.S. provisional application No. 62/038,132, filed Aug. 15, 2014.

TECHNICAL FIELD

This invention relates generally to motor design for any field where a small motor size and fast heat dissipation are required, and relates more particularly to mounting structures provided for such motors.

BACKGROUND ART

The primary components of a motor include stator/winding assembly, rotor/shaft/bearing assembly, and two end caps. Some specific motor applications include their use in printers, security cameras, x-y tables, scanners, CNC machines, dispensers, injector pumps, turntables, optical equipment, and any precision devices of motion control system. Many of these applications either require or work better with a small motor size, including small dimensions measured from the mounting face to the rear of the motor.

A traditional motor provides mounting threads (often four in number) in the front end cap for receiving screws extending from the face of whatever the motor is mounted to. However, using small/short screws to mount the motor becomes ever more difficult as the device as gets smaller and more compact, as the screws normally cannot extend further than the thickness of the end cap into the motor itself without interfering with the operation of some functional part of the motor.

A rear mounting configuration is an alternative seen in many motor applications. Instead of using short screws to hold the motor on a plate from the front, much longer screws extend from the motor's rear into threads of a mounting plate in order to secure the motor to the plate. In that variation, the rear end cap extends outward beyond the perimeter of the stator in order to accommodate apertures for passage of the long screws.

In many applications, dissipation of heat generated by the motor is an important requirement. Many possible structural adaptations to facilitate heat dissipation tend to increase overall motor size, and therefore are often a primary cause of losses in overall performance for a given motor size. To minimize the size increase, engineers typically design a motor's stator with a circular or square shape. Generally, one doesn't see any other shape besides those two. Accordingly, with such a stator shape, the majority of heat dissipation would have to proceed through the front end cap into the mounting plate.

SUMMARY DISCLOSURE

This invention integrates the mounting face and a heat sink into the stator design. In particular, the invention provides mounting holes (typically, four in number) in the stator stack. The stator stack itself is the mounting surface, allowing the heat generated from the stator to dissipate directly to the mounting plate. The front end cap for holding the rotor in alignment is situated inside of the mounting plate and is not part of the mounting surface.

More particularly, a step motor in accord with the present invention comprises a stator assembly interacting electromagnetically with a rotor assembly to produce rotor rotation, wherein the stator assembly is constructed as a stacked lamination structure with at least two stator elements. One element of the stator stack, located at the motor's front end, provides a mounting surface that allows mounting screws to hold the motor to the mounting plate directly through that stator stack. The lamination structure defines a plurality of stator poles with stator teeth thereon and with stator windings coiled around the stator poles. The lamination structure also defines a plurality of mounting holes therethrough, which are located radially outward from the stator poles to avoid interference with motor operation. The rotor assembly includes a rotor on an axial shaft that is aligned concentrically within the stator assembly by means of end caps, each with a central bearing assembly. The rotor has a plurality of rotor teeth, which, due to the concentric alignment via the respective bearing assemblies of the end caps, are spaced proximate to the stator teeth so as to interact electromagnetically for rotor rotation.

Thus, in any application, the new design reduces the effective motor body thickness (the dimension from the mounting face to the rear end motor) for the same motor torque/performance (based on the same stator stack height).

As a further improvement of the aforesaid motor, the outside perimeter of the stator stack may be provided with a saw-tooth shape so as to facilitate improved heat dissipation via thermal radiation to the surrounding air. This radiative heat dissipation supplements or replaces a part of the heat dissipation via the conduction through the direct stator-mounting plate contact surface. Inasmuch as the stator stack already accommodates the provision of mounting screws, this design can add the heat radiating feature to the stator with very minimal cost. Improved heat sinking allows one to construct motors with more aggressive stator winding patterns (more turns per stator pole) than previously possible, which in turn produces greater holding torque on the same size motor than conventional winding.

DETAILED DESCRIPTION

Figure 1A:
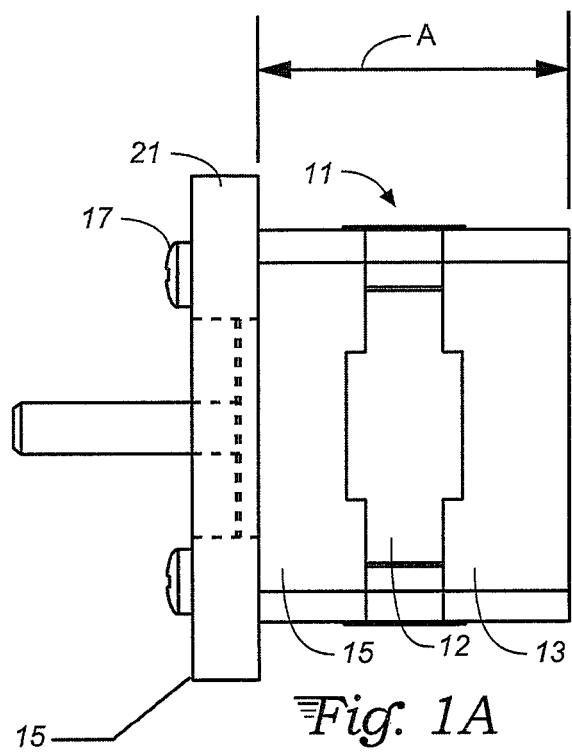
FIGS. 1A and 1B are side and perspective views of a conventional motor with four mounting screws and a mounting plate to show the effective motor body thickness for applications.
Figure 1B:
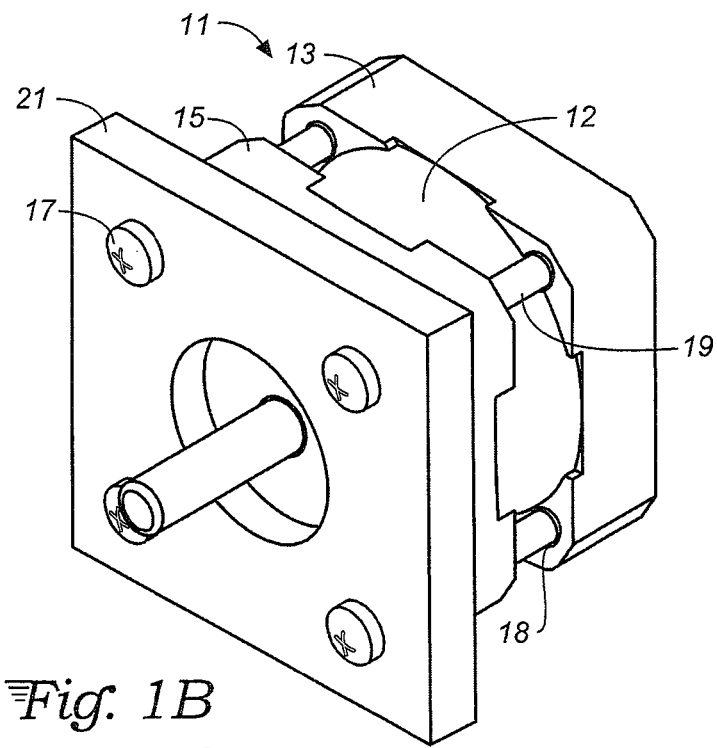
Figure 1C:
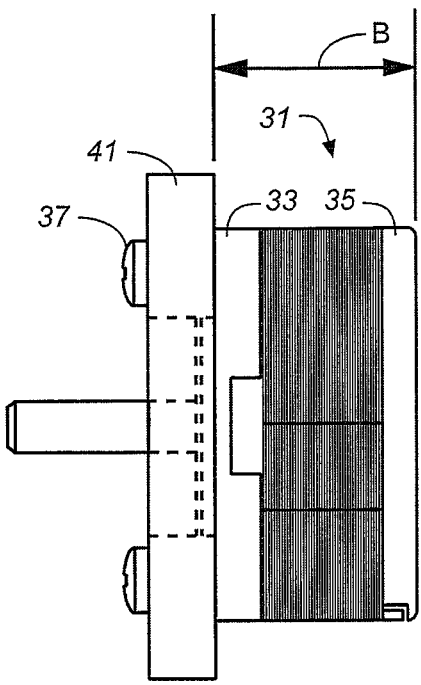
FIGS. 1C and 1D are side and perspective views of a prior art laser welded motor according to U.S. Pat. No. 7,752,733, with four mounting screws and a mounting plate to show the effective motor body thickness is shorter than the one described on FIG. 1A for applications.
Figure 1D:
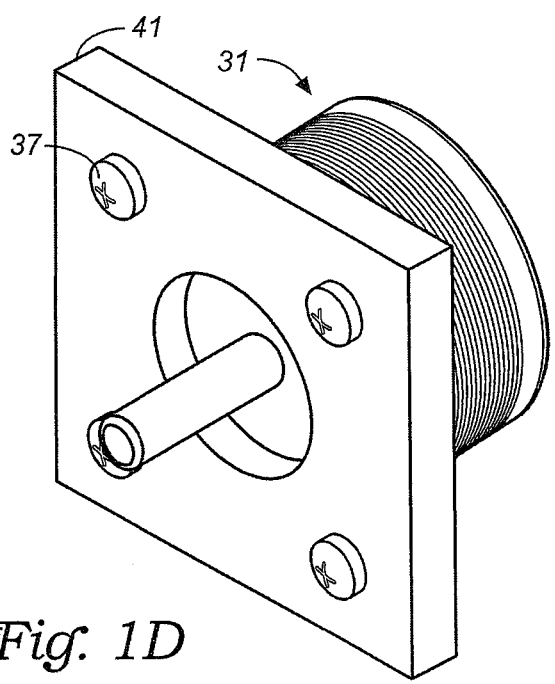

With reference to FIGS. 1A through 1D, prior art motor mounting structures are seen in both side and perspective views. In FIGS. 1A and 1B, a rear mounting configuration is shown, in which long screws 17 extend from the rear of the motor 11 into threads of a mounting plate 21 in order to secure the motor 11 to the plate 21. The rear end cap 13 extends outward beyond the perimeter of the stator 12 in order to accommodate apertures 18 for passage of the long screws 19. In particular, the stator 12 is circular in shape while the end caps 13 and 15 are of square shape with the screw apertures 18 provided in the end cap corners. In FIGS. 1C and 1D, another motor 31 provides four mounting threads in the front end cap 33 for receiving short screws 37 extending from the face of the mounting plate 41 to which the motor 31 is mounted. The length of the screws 37 is limited by the thickness of the front end cap 33.

Figure 2A:
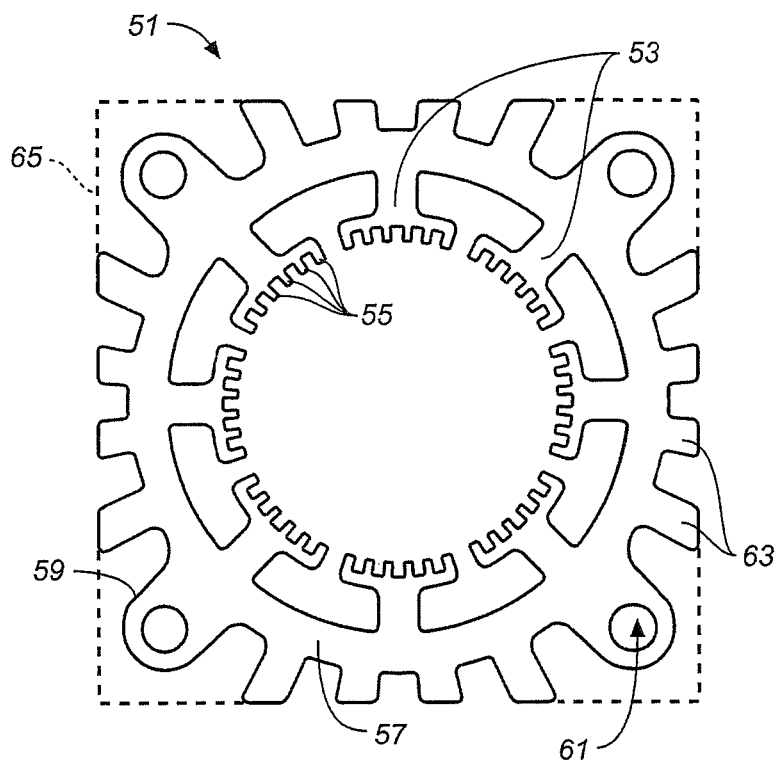
FIG. 2A is a new stator lamination design with saw-tooth shape of a 1.8-degree step motor.
Figure 2B:
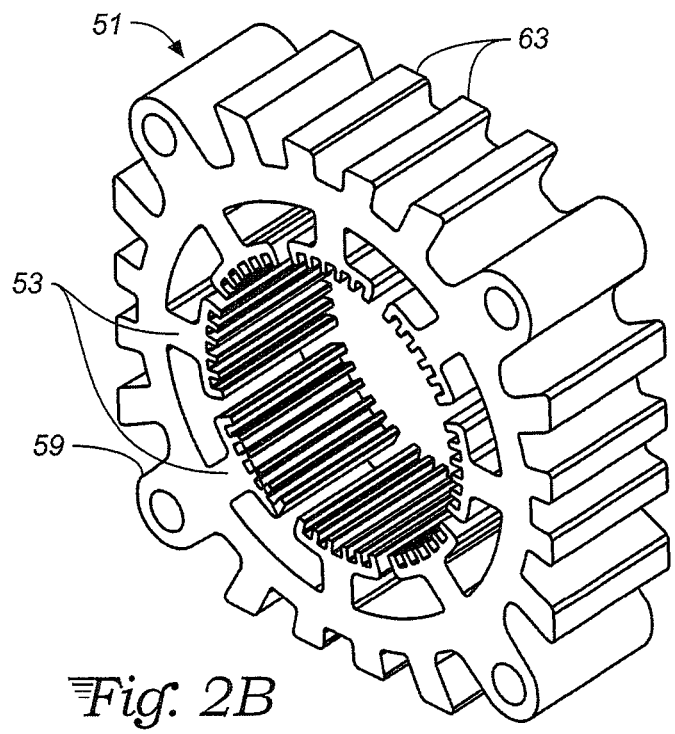
FIG. 2B is a 3D view of the 1.8-degree stator stack with saw-tooth shape functioned as heat sink.
Figure 3A:
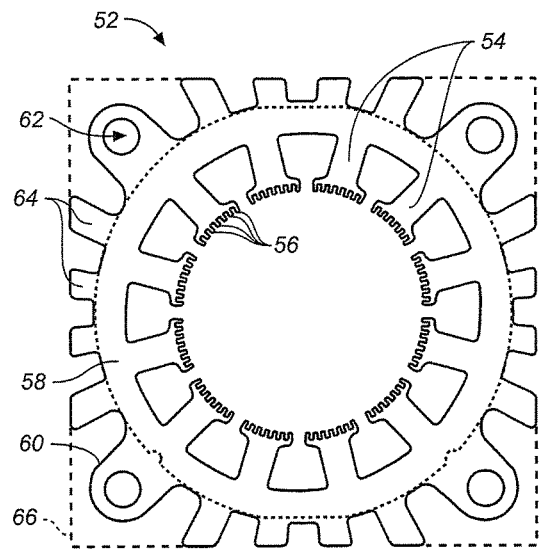
FIG. 3A is a new stator lamination design with saw-tooth shape of a 0.9-degree step motor.
Figure 3B:
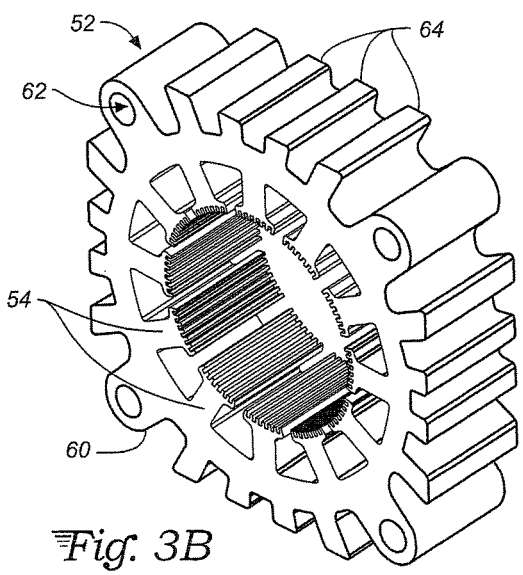
FIG. 3B is a 3D view of the 0.9-degree stator stack with saw-tooth shape functioned as heat sink.

With reference to FIGS. 2A and 2B, and also 3A and 3B, examples of stator elements 51 and 52 for a laminated stator structure of motors in accord with the present invention are seen. In FIGS. 2A and 2B on the left, the stator lamination element 51 is for 1.8° step motor, while in FIGS. 3A and 3B on the right, the stator lamination element 52 is for a 0.9° step motor. The difference between these stator elements for the two step sizes principally in the number of stator poles 53 and 54 (in this example, eight for a 1.8° step and twelve for a 0.9° step) and in the corresponding numbers of teeth 55 and 56 (and/or total numbers of teeth per pole). In either case, the plurality of stator poles (with their respective teeth 55 and 56) extend inward from a ring 57 or 58 of material, while extending outward beyond that ring of material are corner portions 59 or 60 that define four mounting holes 61 or 62 for receiving screws. A further feature is the presence of a plurality of radially outward extending saw-tooth shaped ribs or fins 63 or 64 for providing added heat dissipation. These ribs or fins terminate at a generally square form factor perimeter (dashed lines 65 and 66) defined by the corner portions 59 and 60 with the mounting holes. Thus the added ribs or fins 63 and 64 do not contribute to the size of the lamination elements beyond that necessitated by the presence of the mounting holes 61 and 62. In a stator lamination stack, the plural stator elements 51 and 52 making up that stack will have longitudinally aligning features.

Figure 4:
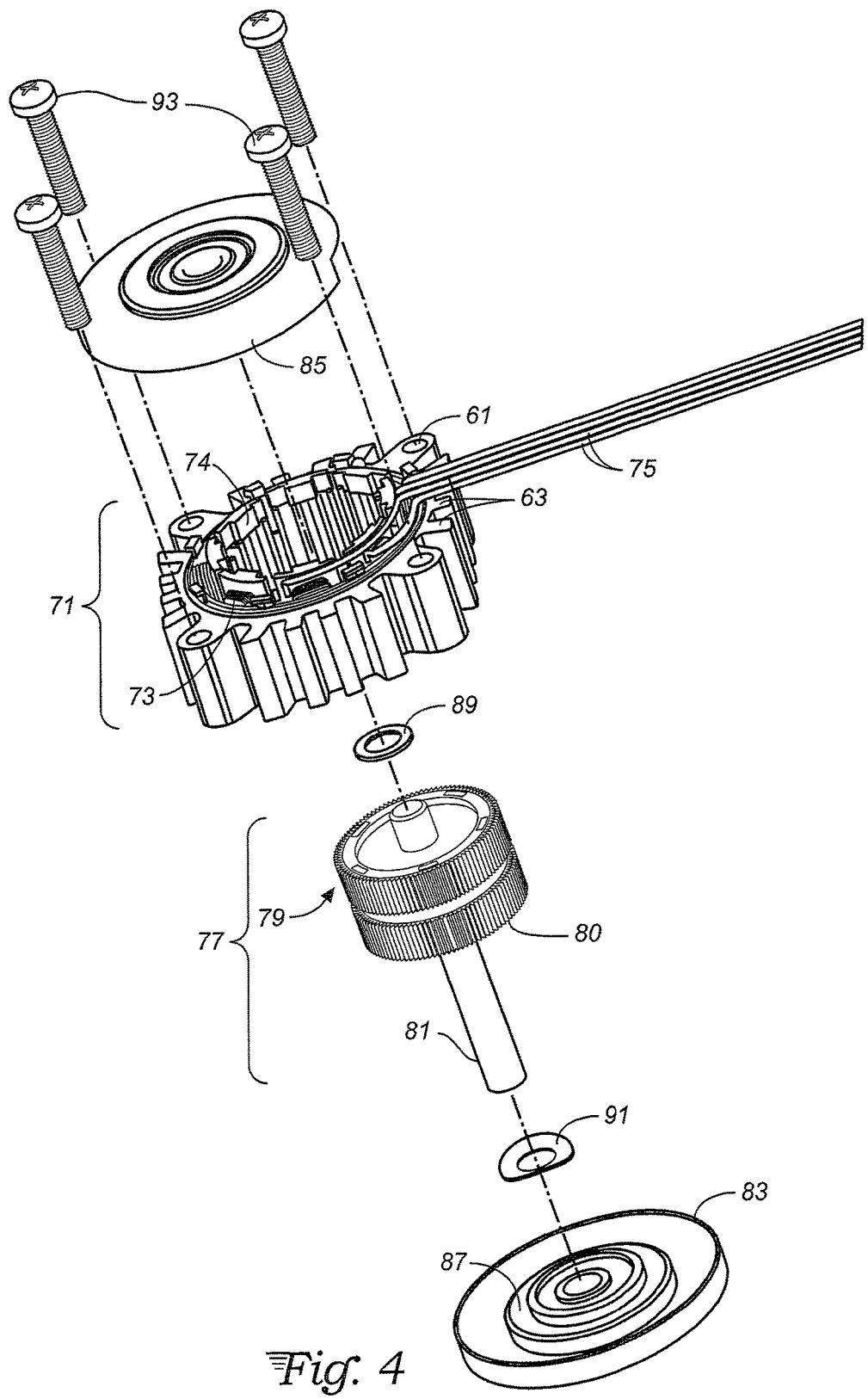
FIG. 4 is the exploded view of the new motor including front end cap with molded bearing assembly (U.S. Pat. No. 8,278,803), pre-load spring, rotor/shaft assembly, spacer stator/winding/lead wire assembly and rear end cap with molded bearing assembly (U.S. Pat. No. 8,278,803) to show the simplicity of the design.

With reference to FIG. 4, the exploded view of a motor using a lamination stack 71 constructed from stator elements 51 or 52 in either FIGS. 2A and 2B or FIGS. 3A and 3B is seen. In the stator assembly 71, stator windings 73 are coiled around the stator poles. Lead wires 75 connected to the stator windings 73 at one end are coupled at the opposite end to receive drive current from a conventional step motor driver (not shown) for electromagnetically activating the stator poles in some specified sequence.

A rotor assembly 77 includes a rotor 79 on an axial shaft 81. The rotor 79 has a plurality of rotor teeth 80 that interact electromagnetically with corresponding stator teeth on those stator poles that are activated at any given time. The rotor assembly 77 is mounted concentrically within the stator assembly 71 by means of end caps 83 and 85. Each end cap has central bearing assembly 87.

Due to the concentric alignment via the respective bearing assemblies 87 of the end caps 83 and 85, the rotor teeth are uniformly spaced proximate to the stator teeth. A spacer washer 89 and preload spring washer 91 may also be included in the rotor and end cap arrangement. The end caps 83 and 85 may utilize a T-pilot design on both end caps, as described in U.S. Pat. Nos. 8,283,841 and 8,278,803, for guiding the placement of the rotor 79 in proper relation to the stator 71, so that no special assembly fixtures would be required. Honing of the inner diameter of both the stator 71 and plastic insulator 74 can hold the concentricity between the rotor and stator during piloting for consistent quality. Motor assembly may then be completed using laser welding, as in U.S. Pat. No. 7,752,733, such that no screws are needed to hold together the motor itself. The only screws 93 involved are those for mounting the motor onto a surface.

Figure 5:
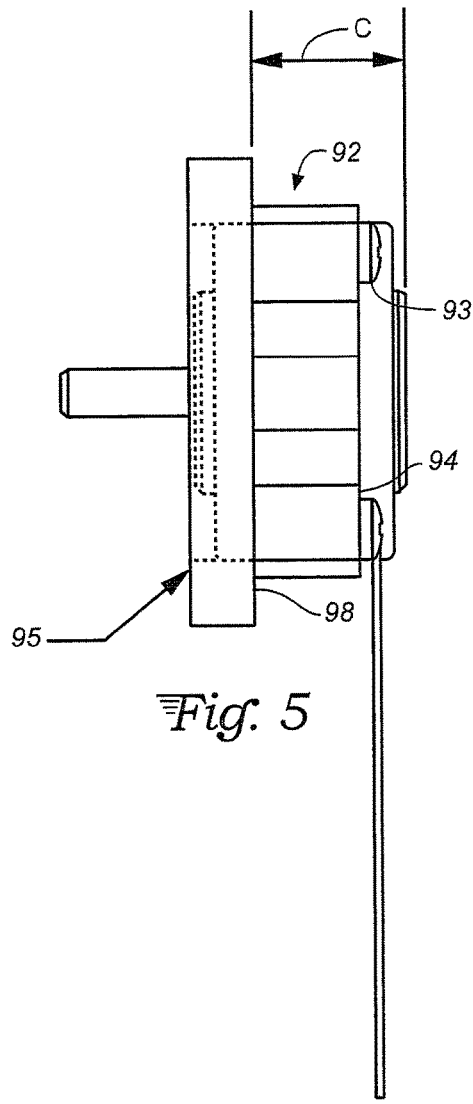
FIGS. 5 and 6 are side and perspective views of the invention motor with four mounting screws and a mounting plate to show the effective motor body thickness for applications and the direct contact between the stator stack (the heat source) to the mounting plate. The effective motor body thickness has been further reduced compared to the FIGS. 1A and 1B.
Figure 6:
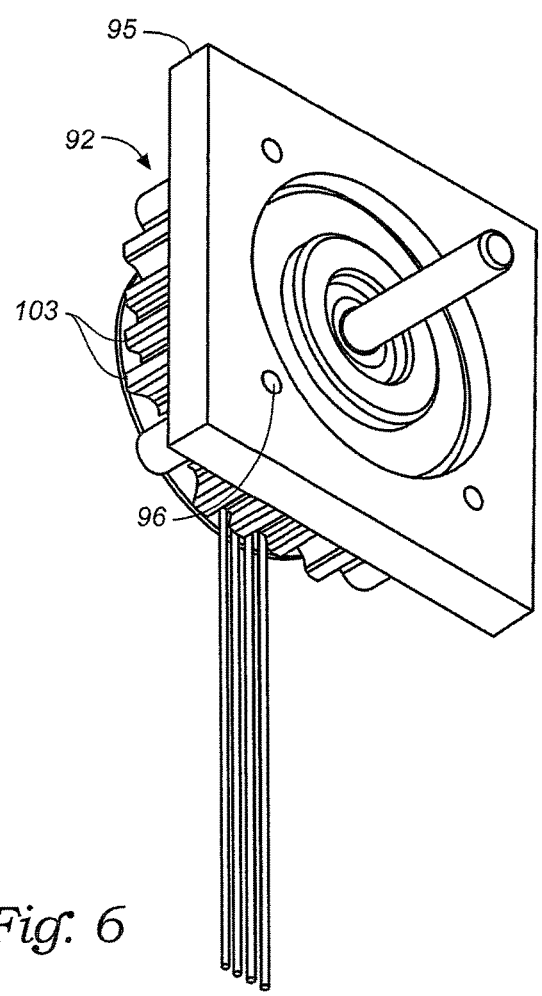

With reference to FIGS. 5 and 6, the assembled motor 92 is seen attached to a mounting plate 95, represented here as a small detached square block but normally any flat surface of any size. The mounting plate 95 has threads 96 therein for receiving screws. Such screws 93 extend from the rear face 94 of the motor 92 through the stator assembly to the mounting plate 95. Typically, the stator lamination may be provided with four mounting holes. The mounting plate and front surface of the stator assembly are in direct contact with each other (at 98) for conductive heat dissipation, assuming the mounting plate is a thermally conductive material. In any case, the stator assembly itself may also be provided with saw-tooth shaped perimeter cutouts forming fins 103 for radiant heat dissipation to the surrounding air in addition to any conductive heat transport directly from the stator assembly to the mounting plate. One advantage of both the direct contact of the stator assembly with the mounting plate and heat radiating fins is that the improved heat sinking ability of the motor now allows one to construct motors with more aggressive stator winding patterns (more turns per stator pole) than previously possible. Any heat generated by energizing the coils is efficiently dissipated. The increased amount of windings in turn produces greater holding torque for the same size motor compared to conventional winding.

Comparing FIGS. 5 and 6 to FIGS. 1A through 1D, one can see that the prior rear mounted motor 11, where the respective end caps 13 and 15 provide holes 18 for screw mounting to the mounting plate 21 has the largest of the effective motor body thicknesses A. The prior front mounted arrangement in FIGS. 1C and 1D does not require as thick a rear end cap 35 and so has a shorter motor body thickness B than the arrangement of FIGS. 1A and 1B. However, the front end cap 33 receiving the screws from the mounting plate 41 must still be relatively thick to properly secure the motor 31. The new version in FIGS. 5 and 6 does not require the end caps to play any role in the mounting of the motor 92. The stator assembly itself provides the passage for the screws 93, so that the invention minimizes body thickness C, it being the shortest of the three cases.

What is claimed is:

1. A step motor, comprising:
    a stator assembly having a lamination structure defining a plurality of stator poles with stator teeth thereon and with stator windings coiled around the stator poles, the lamination structure further defining a plurality of mounting holes therethrough located radially outward from the stator poles;
    a rotor-shaft assembly having a rotor on an axial shaft, the rotor having a rotor teeth thereon; and a pair of end caps, each with a central bearing assembly for mounting the rotor-shaft assembly concentrically within the stator assembly such that stator teeth and rotor teeth are uniformly spaced proximate to one another so as to interact electromagnetically for rotor rotation;

wherein the mounting holes are adapted to receive mounting screws such that the lamination structure provides a mounting surface that will be in direct contact with a mounting plate whenever the step motor is mounted onto such plate by means of the mounting screws.

2. The step motor as in claim 1, wherein the lamination structure has a radially outer perimeter with a saw-tooth shape defining heat-dissipation fins thereon.

3. The step motor as in claim 1, wherein the lamination structure comprises two or more identical stator lamination elements stacked together such that corresponding features on each element align.

4. The step motor as in claim 3, wherein each stator lamination element has a ring of material with the stator poles extending radially inward therefrom and with a plurality of corner elements extending radially outward therefrom, the corner elements having holes therein forming the mounting holes for receiving screws.

5. The step motor as in claim 3, wherein each stator lamination element is contained within a generally square perimeter outline with corners thereof receiving the mounting holes and with a plurality of saw-tooth shaped cutouts between the corners defining heat-dissipation fins.

6. The step motor as in claim 1, wherein the pair of end caps are confined to a central area inside of the location of the mounting holes.

7. The step motor as in claim 1, wherein the stator assembly is characterized by a winding density defined by a number of turns of stator windings per stator pole that is selected based upon an efficiency of heat dissipation from the stator assembly.

* * * * *